United States Patent
Erickson et al.

(10) Patent No.: US 7,021,682 B2
(45) Date of Patent: Apr. 4, 2006

(54) CHASSIS LOCKING BAR

(75) Inventors: Vernon D. Erickson, Dakota Dunes, SD (US); David R. Davis, Jefferson, SD (US); Kevin A. Patin, El Paso, TX (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/600,734

(22) Filed: Jun. 20, 2003

(65) Prior Publication Data

US 2004/0256864 A1    Dec. 23, 2004

(51) Int. Cl.
*E05C 19/00* (2006.01)

(52) U.S. Cl. ............... 292/303; 292/204; 292/DIG. 11; 361/683; 361/679; 312/223.2

(58) Field of Classification Search ............... 292/303, 292/32, 33, 42, 106, 128, 96, 162, DIG. 11, 292/35, 41, 292, 163, 164, 175, DIG. 53, 292/DIG. 64, 108, 204, 207; 361/683, 724, 361/726; 70/164, 58, 163, 158; 403/324–327, 403/321, 322.1; 312/223.3, 327, 328
See application file for complete search history.

(56) References Cited

U.S. PATENT DOCUMENTS

| | | | | |
|---|---|---|---|---|
| 288,097 A | * | 11/1883 | Morrison ..................... | 292/207 |
| 1,000,268 A | * | 8/1911 | Jadronja ..................... | 312/333 |
| 1,114,510 A | * | 10/1914 | Owens ........................ | 292/213 |
| 1,245,132 A | * | 10/1917 | Tarshis et al. ................ | 292/42 |
| 1,573,579 A | * | 2/1926 | Ross ........................... | 292/145 |
| 1,876,748 A | * | 9/1932 | Rand, Jr. et al. ........ | 312/332.1 |
| 2,315,455 A | * | 3/1943 | Sale ........................... | 220/286 |
| 2,419,587 A | * | 4/1947 | Parks ...................... | 292/259 R |
| 3,598,462 A | * | 8/1971 | Kanitz ........................ | 312/219 |
| 3,626,730 A | * | 12/1971 | Murase ......................... | 70/70 |
| 3,765,709 A | * | 10/1973 | Van Wyck .................. | 292/33 |
| 4,153,178 A | * | 5/1979 | Weavers ..................... | 220/315 |
| 4,469,225 A | * | 9/1984 | Takahashi ................ | 206/387.1 |
| 4,562,708 A | * | 1/1986 | Gros ............................. | 70/94 |
| 4,630,852 A | * | 12/1986 | White et al. .................. | 292/87 |
| 4,921,122 A | * | 5/1990 | Bornstein et al. ........... | 220/326 |
| 4,998,425 A | * | 3/1991 | Hoogland .................... | 70/159 |
| 5,103,659 A | * | 4/1992 | Benefield, Sr. ................ | 70/94 |
| 5,116,099 A | * | 5/1992 | Kwasnik et al. ....... | 297/188.15 |
| 5,154,456 A | * | 10/1992 | Moore et al. ................ | 292/162 |
| 5,235,830 A | * | 8/1993 | Benge ............................ | 70/56 |
| 5,267,688 A | * | 12/1993 | Benefield ..................... | 232/17 |
| 5,287,245 A | * | 2/1994 | Lucente et al. ............. | 361/680 |
| 5,419,165 A | * | 5/1995 | Perkins .......................... | 70/14 |
| 5,446,618 A | * | 8/1995 | Tetsuya et al. .............. | 361/683 |
| 5,465,191 A | * | 11/1995 | Nomura et al. ............. | 361/681 |
| 5,524,944 A | * | 6/1996 | Berg .......................... | 292/163 |
| 5,622,064 A | * | 4/1997 | Gluskoter et al. ............. | 70/14 |
| 5,638,977 A | * | 6/1997 | Bianchi ...................... | 220/314 |
| 5,751,545 A | * | 5/1998 | Jung ......................... | 361/683 |

(Continued)

*Primary Examiner*—Brian E. Glessner
*Assistant Examiner*—Carlos Lugo
(74) *Attorney, Agent, or Firm*—Nathan T. Grebasch; Suiter West Swantz PC LLO

(57) ABSTRACT

An apparatus and method for allowing securing/unsecuring of an access panel from a generally opposing side of a chassis. The apparatus includes a latch for securing the panel disposed on a side of the chassis. A locking mechanism extends from the latch to a side opposite the latch. The locking mechanism provides a locking bar which may be manipulated to either positively secure the panel, via a screw or lock, or release the panel from the side opposite the latch.

18 Claims, 6 Drawing Sheets

U.S. PATENT DOCUMENTS

| | | | |
|---|---|---|---|
| 5,825,626 A | 10/1998 | Hulick et al. | 361/724 |
| 5,967,466 A | 10/1999 | Osborne et al. | 248/27.1 |
| 5,997,115 A * | 12/1999 | Radloff et al. | 312/222 |
| 6,018,457 A | 1/2000 | Mroz | 361/685 |
| 6,053,586 A * | 4/2000 | Cook et al. | 312/223.2 |
| 6,059,135 A * | 5/2000 | James et al. | 220/23.4 |
| 6,099,050 A * | 8/2000 | Daoud | 292/281 |
| 6,157,532 A * | 12/2000 | Cook et al. | 361/681 |
| 6,209,975 B1 | 4/2001 | Lai | 312/223.2 |
| 6,246,572 B1 | 6/2001 | Myers et al. | 361/683 |
| 6,246,576 B1 | 6/2001 | Sands et al. | 361/686 |
| 6,297,948 B1 * | 10/2001 | Buican et al. | 361/683 |
| 6,347,848 B1 * | 2/2002 | Cho | 312/219 |
| 6,356,436 B1 * | 3/2002 | Buican et al. | 361/683 |
| 6,373,692 B1 * | 4/2002 | Cheng | 361/683 |
| 6,375,287 B1 * | 4/2002 | Lai | 312/223.2 |
| 6,388,874 B1 | 5/2002 | Liang et al. | 361/685 |
| 6,398,325 B1 * | 6/2002 | Chen et al. | 312/223.2 |
| 6,711,007 B1 * | 3/2004 | Syring et al. | 361/683 |
| 6,772,613 B1 * | 8/2004 | Webb et al. | 70/159 |

* cited by examiner

CHASSIS LOCKING BAR

FIELD OF THE INVENTION

The present invention generally relates to the field electronics and particularly to a chassis securing mechanism.

BACKGROUND OF THE INVENTION

Electronic devices, and in particular computers, typically are enclosed in chassis which permit users to modify components. For instance, computer users may wish to add additional components, remove defective components or change components to vary functionality. Previously, changing components was time consuming because of the mechanisms for securing the chassis.

Existing securing systems may fail to properly secure the chassis cover to the chassis or do not allow easy access. Additionally, front mounted components such as floppy drives, CD-ROM drives and the like may be difficult for users to remove. For instance, users may wish to have easy access to internal components to change, add, or remove components. Current securing systems for chassis have failed to include a positive securing mechanism. For example, during transport chassis doors may become dislodged.

Moreover, in some situation security is an issue. For example, in business, academic, and organizational environments computers are often managed by trained personnel. Thus, resource owners may wish to discourage unauthorized users from altering systems, minimize vandalism, component theft and the like. Previous systems either fail to address security, or included bulky devices which may be difficult to operate or are aesthetically unattractive.

Therefore, it would be desirable to provide a chassis locking bar capable of securing a chassis from a rear portion of the chassis.

SUMMARY OF THE INVENTION

Accordingly, the present invention is directed to mechanism and method for permitting securing/releasing a chassis from a generally opposing direction. The mechanism of the present invention allows positive securing of the chassis.

In an aspect of the present invention, a securing mechanism includes a panel for hingedly connecting to a chassis substantially along a first side. A latch is mounted to a second side directed generally opposite the first side, for securing/releasing the panel. A locking mechanism is slidably mounted to the panel or chassis. The locking mechanism extends from the first side to the second side. The locking mechanism permits a user to secure/release the panel along the second from the first side.

In a further aspect, a method for securing/releasing a computer chassis is presented. Initially, a securing device on a first side of the chassis is manipulated. A locking mechanism is slid along an axis extending from the first side to a second side generally opposite the first. A latch is pivoted in response to sliding the lock mechanism to release a panel or secure a panel.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers correspond to generally corresponding structures.

Referring generally now to FIGS. 1 through 6, exemplary embodiments of the present invention are shown wherein a chassis securing mechanism is discussed. The chassis securing mechanism of the present invention provides an efficient system and method for securing a chassis.

Figure 1:
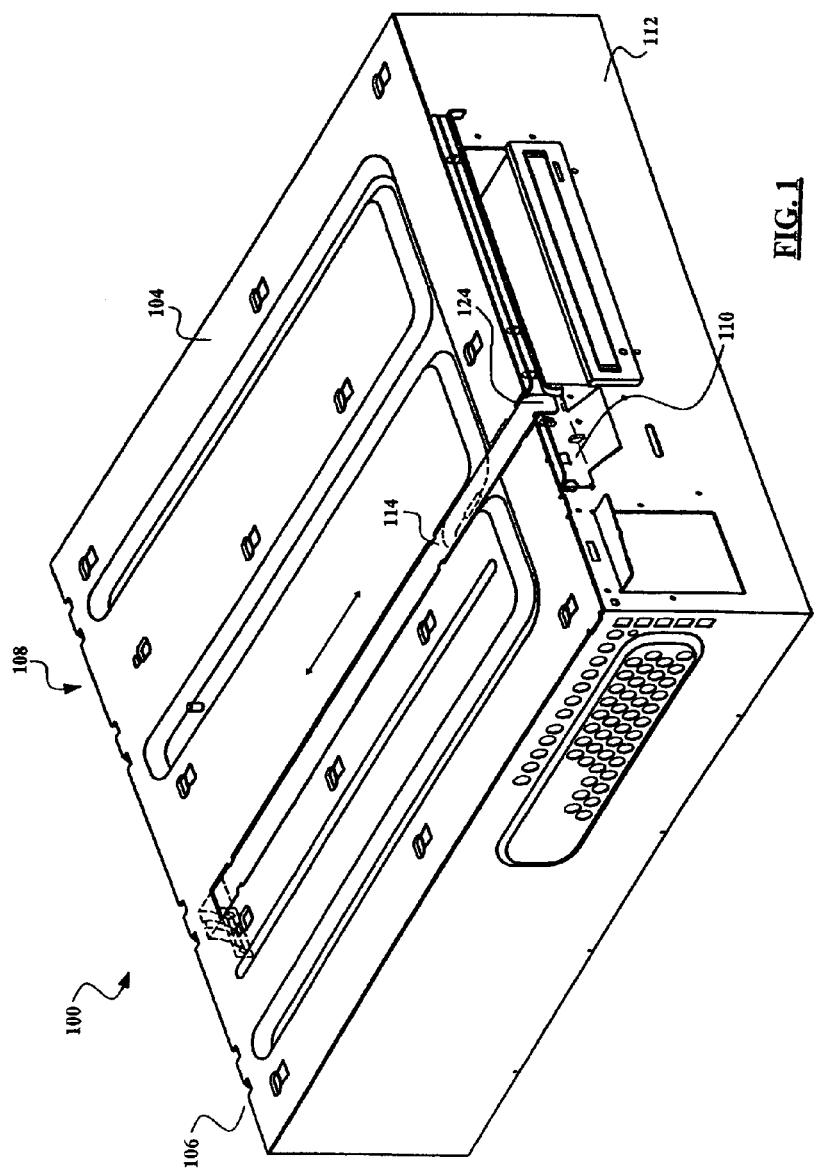
FIG. 1 is a perspective view of a chassis including a securing mechanism capable of securing/releasing a panel from a generally opposing side.

Referring to FIG. 1, a chassis 100 for containing an electronic device is discussed. The chassis 100 includes a securing mechanism. The chassis 100 is formed by fixedly securing a series of panels together. In further embodiments, a chassis is formed as a frame with side panels attached thereto. For example, a generally rectangular chassis may be formed by securing five fixed panels together. A panel 104 is hingedly connected to the chassis 100. A removable hinged panel is included to allow access. The hinge 106 is formed of curved tabs and slots included in the chassis. Utilizing a slot and tab hinge allows for removal of the panel 104 as well. Various connecting systems such as hinges, slots and tabs, interlocking connections, and the like may be employed without departing from the scope and spirit of the present invention. The hinge 106 is disposed substantially along an edge of a first side 108. For instance, the first side 108 is disposed towards the back or towards a less accessible direction. Disposing the hinge towards the back permits access to the interior of the chassis 100 with minimal repositioning.

Figure 2:
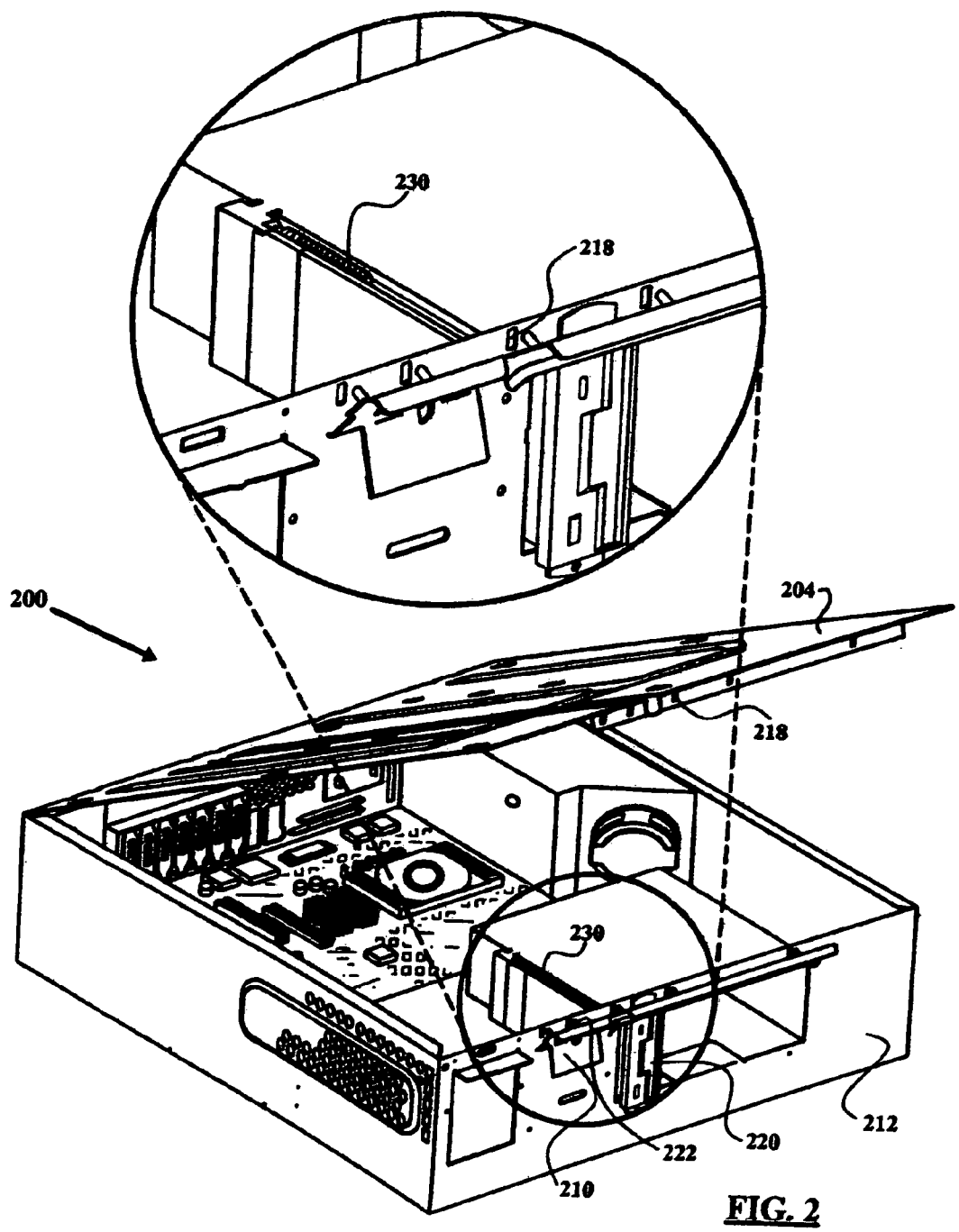
FIG. 2 is a perspective view of a chassis including a locking mechanism and latch for securing/releasing an access panel, wherein the mechanism is disposed in a released position.
Figure 3:
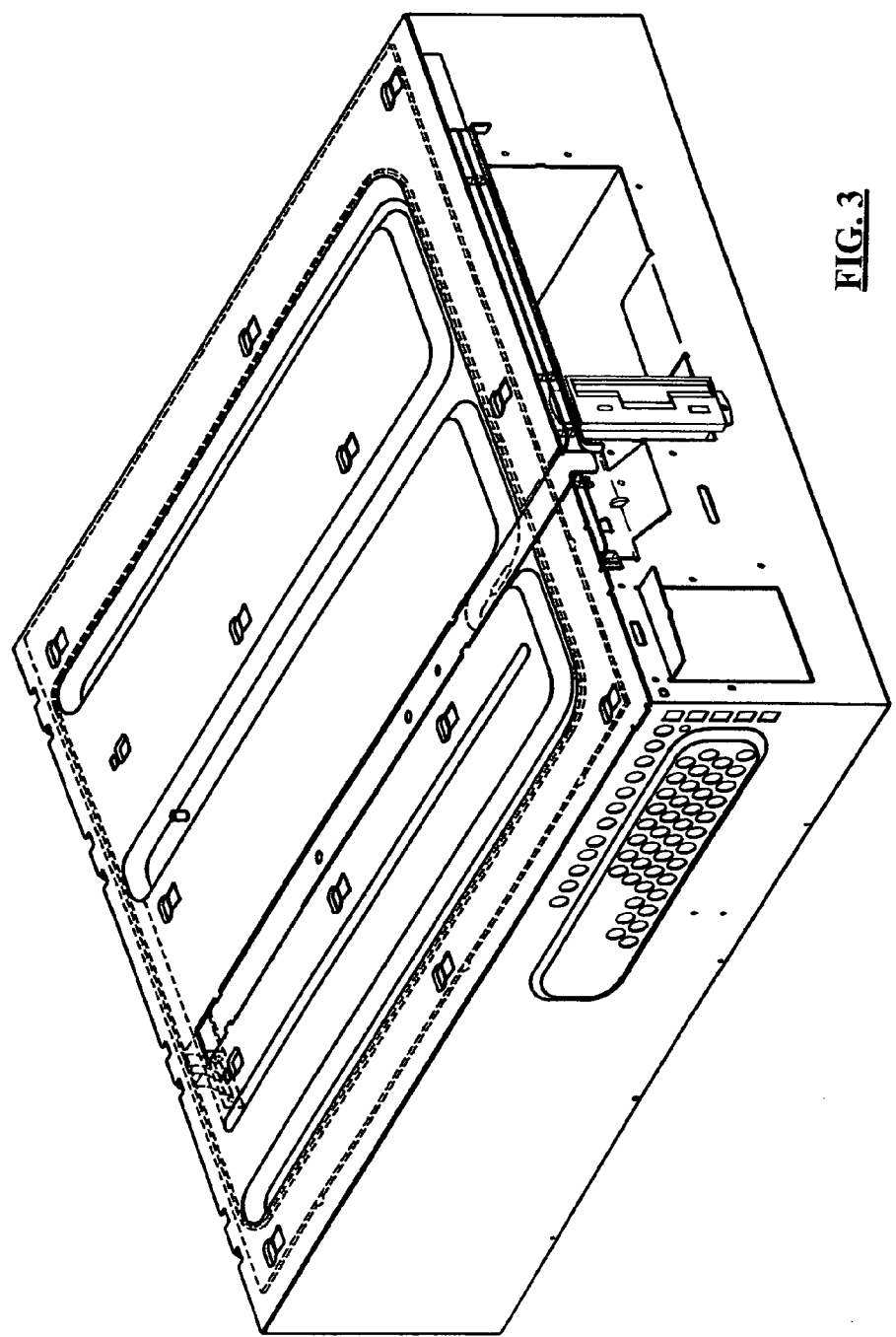
FIG. 3 is a perspective view of a chassis including a locking mechanism and latch disposed in a securing position.

A latch 110 is mounted to a second side 112 of the chassis 100. The second side 112 is substantially parallel to and opposite the first side 108. For example, the first side 108 is the back of the chassis for accepting communication and electrical connections and the second side 112 is the front of the chassis including apertures for accepting removable media devices or the like for which users wish to have ready access. The latch 110 may be pivotally mounted to the second side so rotation of the latch 110 secures or releases the panel 104. A latch hinge may be formed utilizing a pivot pin, interlocking structures, hinge mechanism, and the like. Referring to FIG. 2, tab 222 and slot 218 or a series of mechanical structures are included in the latch for engaging corresponding structures in the panel 204 to secure and/or align the hinged panel 204 to the chassis 200. As should be apparent FIG. 2 indicates a released position for the latch, see generally FIG. 3 wherein the latch is in a secured position.

Moreover, the latch 210 may be utilized to secure components within the chassis 200. As may be best seen in FIG. 2, a latch 210 may be formed to secure a component such as a floppy drive, a CD-ROM drive, a DVD drive and the like. For example, a floppy disk drive 220 is secured in an aperture on the second side 212, so the latch 210 at least partially secures the component. In the same example, the component may be secured via a tab or flap included on the component clamped between the latch 210 and a panel or chassis frame. Additionally, alignment tabs 222 included on the latch may prevent a component from moving along the axis of the latch. Because of the location of the latch 202 on the second side 212, a user may quickly secure/release a component or change a component's media. Utilizing the latch to secure the access panel and a component, such as a front mount component, may reduce manufacturing costs by reducing the number of parts required and the labor to install components.

Referring to FIG. 1, a locking mechanism 114 is slidably mounted to the panel 104. As may be best seen in FIG. 4, the locking mechanism may be disposed in a sleeve or recessed portion of the panel such as between an inner and outer portion of the panel or aligned by tabs folded-over the recessed channel. Additionally, the locking mechanism may be mounted to the chassis. The locking mechanism forms a locking bar extending substantially from the first side 108 to the second side 112. The locking mechanism allows a user to manipulate the mechanism from the first side 108 to release/secure the latch 110 disposed on the second side 112 and if applicable a component. The locking mechanism 114 includes a tab 124 or the like for engaging the latch 110 disposed on the second side 112. Those of skill in the art will appreciate that the locking mechanism and latch may be physically connected via a hinge, a flexible band, a pivot pin, an interlocking mechanical structure, and the like.

Figure 4:
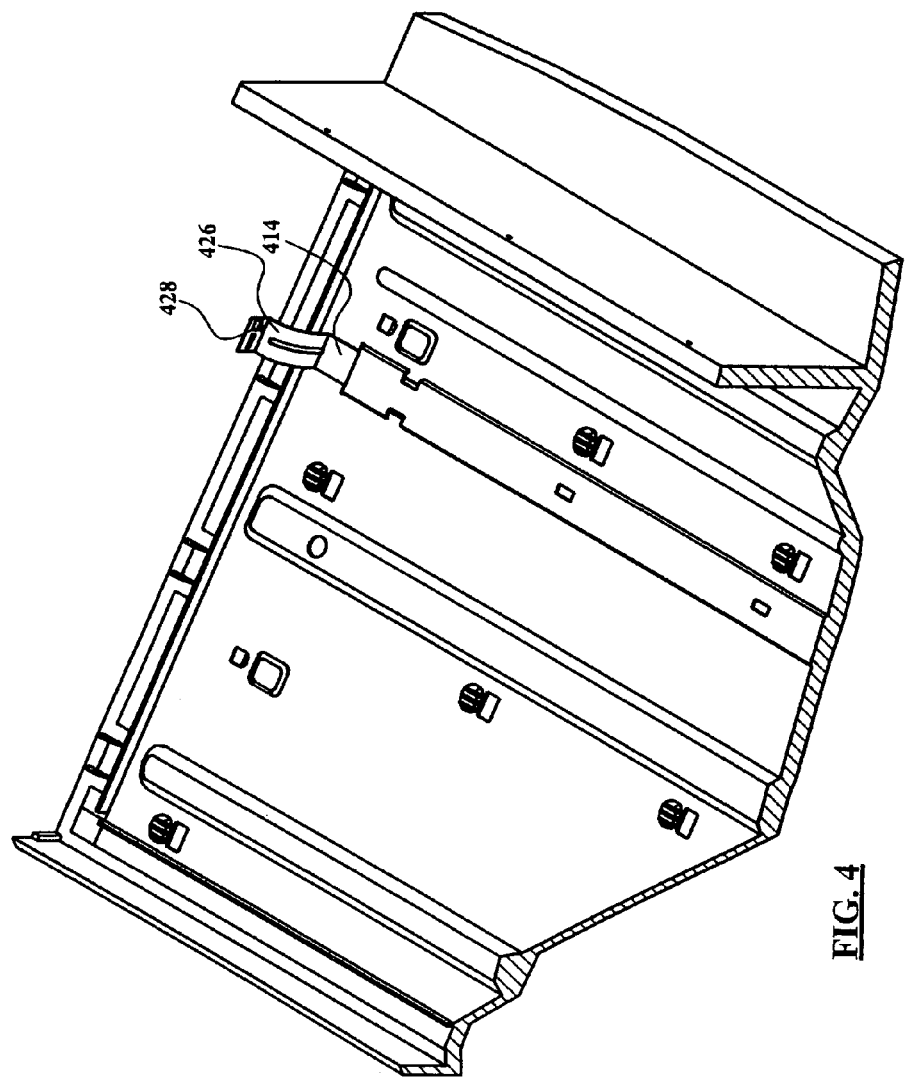
FIG. 4 is a cut away view of a locking mechanism slidebly mounted to a panel including a tabbed portion for securing the mechanism to the chassis.
Figure 5:
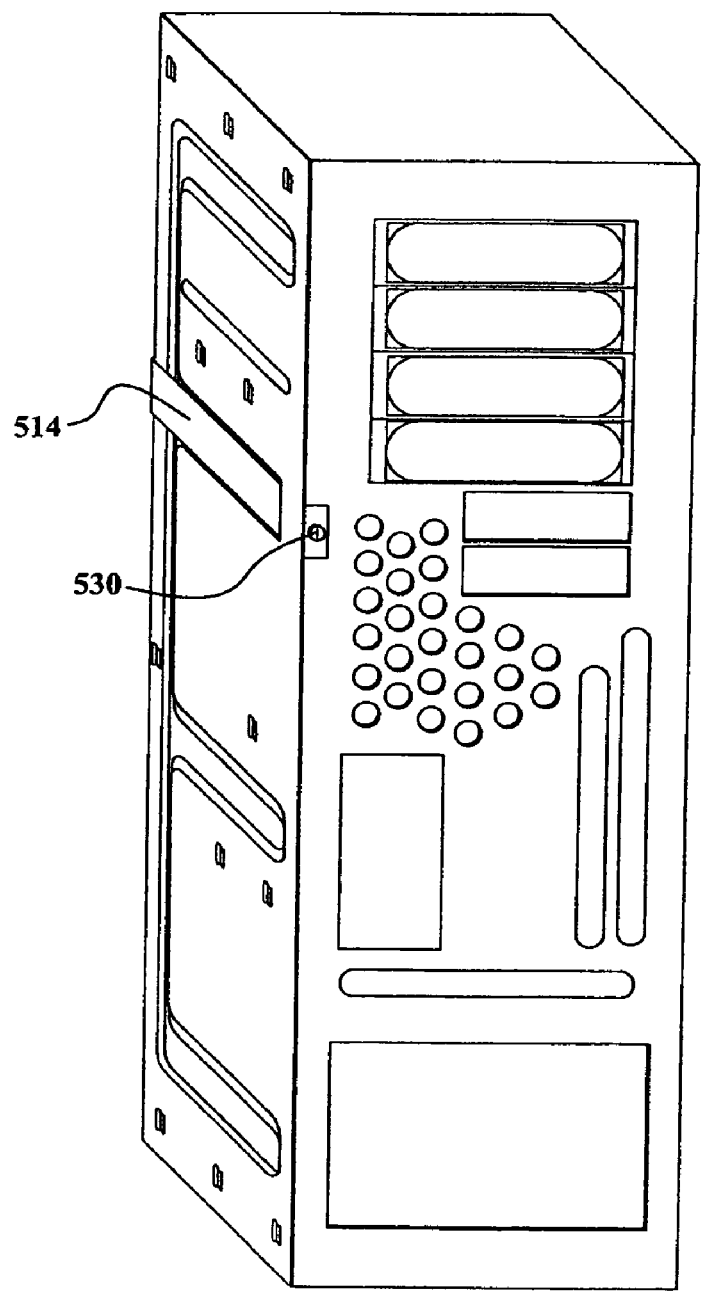
FIG. 5 is a side view of a chassis including a thumb screw for securing a locking mechanism to the chassis.

Referring to FIG. 4, a tab 426 or flap is included on the end of a locking mechanism 414 directed towards a first side. For instance, the tab 426 is curved to align with a fixed chassis panel and allow for easy longitudinal movement to secure/release the panel. The locking mechanism 414 may include an aperture 428 corresponding to an aperture included in the chassis. As may be best seen in FIG. 5, the locking mechanism 514 aperture may align with a corresponding aperture in the chassis, when the latch is securing the panel. The apertures are capable of accepting a securing device such as screw 530, a pin and a lock, and the like. For instance, a twist type lock, which includes a pivoting bar for inserting through an aperture, sold under the trademark KENSINGTON lock is used. In further embodiments, when multiple apertures are included in the locking mechanism it may be preferable to dispose the apertures so as to prohibit the application of more than one securing device. For example, it may be preferable to disposing an aperture for a lock such that the lock would effectively block a user from also utilizing a screw in an adjacent aperture. In additional embodiments, the securing mechanism may be connected to the locking mechanism 114 generally along the second side 112 adjacent the latch 110, FIG. 1. Those of skill in the art will appreciate that the securing mechanism may be disposed along the top, bottom, or sides of the chassis as desired while engaging the locking mechanism. Including a securing device may discourage unauthorized system alteration, minimize vandalism, component theft, and the like. In another embodiment a locking mechanism may be provided in the form of a hasp mechanism.

Referring to FIG. 2, a spring may be further included. The spring is connected to the latch, additionally the spring may be attached to the lock mechanism. Including a spring such as an extension spring 230 biases the mechanism into a released orientation, when a securing device is removed. For instance, the extension spring 230 biases the latch and locking mechanism when in a released position. Utilizing a spring to bias the mechanism in a secured position requires the user to positively operate the mechanism, thus minimizing accidental opening of the chassis and/or release of a component.

Figure 6:
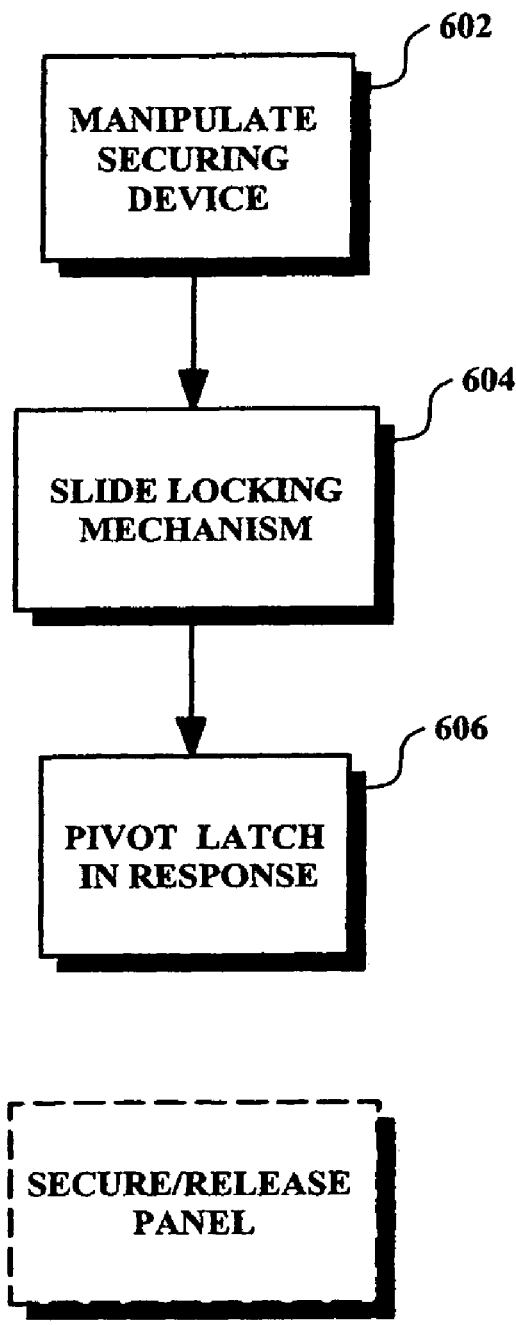
FIG. 6 is a flow chart illustrating a method for securing/releasing a computer chassis.

Referring to FIG. 6, a method for securing/releasing a computer chassis is described. Initially, a securing device on a first side of a chassis is manipulated 602. Manipulating the securing device may include screwing/unscrewing a thumb screw, locking/unlocking a lock, and the like. Allowing securing from a first side allows efficient access without disposing a securing device adjacent to components disposed on a second side.

A locking mechanism may be slid 604 along the longitudinal axis of the mechanism. For instance, the locking mechanism may slide to align respective apertures in the locking mechanism with the chassis, to allow securing or slid towards a second side generally opposing the first to a released position.

A pivoting latch is rotated 606 in response to longitudinal motion of the locking mechanism. For instance, the latch may rotate due to a biasing force acting to force the latch into a released position. Rotation of the latch causes a panel cover to secure/release. In an additional step, a component is adjusted. Adjusting includes at least one of removing a component and adding a component.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented It is believed that the apparatus and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A securing mechanism for a chassis, comprising:
    a panel for adjustably connecting to the chassis substantially along a first side;
    a latch mounted to a second side of said chassis substantially opposite the first side, for latching the panel, the latch being hingedly connected to the chassis; and
    a locking mechanism slidably mounted to the panel, the locking mechanism extending substantially from the first to the second side;
    wherein sliding manipulation of the locking mechanism at the first side results in at least one of releasing or securing of the latch towards or away from the chassis.

2. The securing mechanism for a chassis of claim 1, further comprising means for biasing connected to at least one of the latch or the locking mechanism.

3. The securing mechanism for a chassis of claim 1, wherein the locking mechanism and the chassis individually include corresponding apertures for receiving a securing device.

4. The securing mechanism for a chassis of claim 1, further comprising a securing device for engaging the locking mechanism and the chassis at the first side.

5. The securing mechanism for a chassis of claim 4, wherein a securing device is selected from the group consisting of a screw and a lock.

6. The securing mechanism for a chassis of claim 1, wherein the latch at least partially secures a component which is at least partially disposed between the latch and the chassis.

7. An electronic housing, comprising:
    a chassis, for containing an electronic device;
    a panel hingedly connected substantially along a first side of said chassis;
    a latch mounted to a second side of said chassis substantially opposite the first side, for latching the panel, the latch being hingedly connected to the chassis; and
    a locking mechanism slidably mounted to the panel, the locking mechanism extending substantially from the first to the second side;
    wherein sliding manipulation of the locking mechanism at the first side results in at least one of releasing or securing of the latch towards or away from the chassis.

8. The electronic housing of claim 7, wherein the latch at least partially secures a component.

9. The electronic housing of claim 7, wherein the latch at least partially secures a component which is at least partially disposed between the latch and the chassis.

10. The electronic housing of claim 7, further comprising means for biasing the latch.

11. The electronic housing of claim 7, wherein the locking mechanism and the chassis individually include corresponding apertures for receiving a securing device.

12. The electronic housing of claim 7, further comprising a securing device for engaging the locking mechanism and the chassis at the first side.

13. The electronic housing of claim 12, wherein a securing device is selected from the group consisting of a screw and a lock.

14. A system, comprising:
    a chassis for containing a computer;
    a panel adjustably connected substantially along a first side of said chassis;
    a latch mounted to a second side of said chassis substantially opposite the first side, for latching the panel, the latch being hingedly connected to the chassis;
    a locking mechanism slidably mounted to the panel, the locking mechanism extending substantially from the first to the second side; and
    means for securing the locking mechanism to the chassis substantially disposed on the first side;
    wherein manipulation of the locking mechanism at the first side results in at least one of releasing or securing of the latch towards or away from the chassis.

15. The system of claim 14, wherein the latch at least partially secures a component which is at least partially disposed between the latch and the chassis.

16. The system of claim 14, further comprising means for biasing of the latch.

17. The system of claim 14, wherein the securing means is selected from the group consisting of a screw and a lock.

18. A securing mechanism for an electronic device chassis, comprising:
    a panel for adjustably connecting to the electronic device chassis substantially along a first side, the panel being configured to be removed from the chassis;
    a latch mounted to a second side of said chassis substantially parallel to the first side, the latch being constructed to pivotally latch the panel along the second side; and
    a locking mechanism slidably mounted to the panel, the locking mechanism extending substantially from the first side to the second side;
    wherein sliding manipulation of the locking mechanism at the first side results in at least one of releasing or securing of the latch towards or away from the chassis at the second side substantially opposite the first side.

* * * * *